United States Patent
Henneken et al.

(10) Patent No.: US 8,388,493 B2
(45) Date of Patent: Mar. 5, 2013

(54) METHOD FOR OPERATING A DRIVETRAIN

(75) Inventors: Markus Henneken, Kressbronn (DE);
Thilo Schmidt, Meckenbeuren (DE);
Bernd Allgaier, Kressbronn (DE)

(73) Assignee: ZF Friedrichshafen, AG,
Friedrichshafen (DE)

( * ) Notice: Subject to any disclaimer, the term of this patent is extended or adjusted under 35 U.S.C. 154(b) by 926 days.

(21) Appl. No.: 12/346,923

(22) Filed: Dec. 31, 2008

(65) Prior Publication Data
US 2009/0181821 A1     Jul. 16, 2009

(30) Foreign Application Priority Data

Jan. 14, 2008 (DE) .......................... 10 2008 000 046

(51) Int. Cl.
*B60W 20/00*     (2006.01)
(52) U.S. Cl. ....................... 477/5; 180/65.275
(58) Field of Classification Search ............... 180/65.21,
180/65.245, 65.265, 65.275, 65.28, 65.285;
477/2, 5, 6; 701/22
See application file for complete search history.

(56) References Cited

U.S. PATENT DOCUMENTS

| | | | |
|---|---|---|---|
| 6,752,741 B2 * | 6/2004 | Kahlon et al. | 477/5 |
| 7,117,965 B2 * | 10/2006 | Yatabe et al. | 180/65.235 |
| 2007/0080006 A1 * | 4/2007 | Yamaguchi | 180/65.3 |
| 2008/0176706 A1 * | 7/2008 | Wu et al. | 477/5 |

* cited by examiner

*Primary Examiner* — Katy M Ebner
(74) *Attorney, Agent, or Firm* — Davis & Bujold, PLLC

(57) ABSTRACT

A method for operating a drivetrain of a motor vehicle including a hybrid drive with a combustion engine and an electric motor. A transmission is arranged between the hybrid drive and a drive output and a clutch is arranged between the combustion engine and the electric motor so that, if a failure occurs in the drivetrain, especially in a transmission control device of the transmission, a gear corresponding to an emergency gear is engaged or remains engaged in the transmission. When the emergency gear is engaged, the motor vehicle is in motion and the engine speed falls below a defined value, the clutch arranged between the combustion engine and the electric motor disengages.

18 Claims, 1 Drawing Sheet

METHOD FOR OPERATING A DRIVETRAIN

This application claims priority from German patent application serial no. DE 10 2008 000 046.9 filed Jan. 14, 2008.

FIELD OF INVENTION

The invention concerns a method for operating a drivetrain of a motor vehicle comprising at least a transmission and a hybrid drive.

The main components of a motor vehicle drivetrain are a drive aggregate and a transmission. A transmission converts torques and rotational of the drive aggregate speeds into a traction force. The present invention concerns a method for operating a drivetrain comprising a transmission and, as its drive aggregate, a hybrid drive with a combustion engine and an electric motor.

Associated with the transmission of such a drivetrain is a transmission control device, which controls and regulates the functions of the transmission. Now, when a fault occurs in such a drivetrain, in particular in the transmission control device of the transmission, it is already known from prior practice to engage or leave engaged a gear in the transmission, which corresponds to an emergency transmission gear. An emergency gear should be understood to mean a gear of a transmission which, in the event of a failure in the drivetrain, especially in the transmission control device, enables emergency operation of the transmission and thus of the drivetrain.

BACKGROUND OF INVENTION

As is known from prior practice, when in the event of a failure in the transmission a gear corresponding to emergency operation is or remains engaged, the problem can occur that the combustion engine stalls. To avoid stalling the engine if a friction element arranged between the electric motor of the hybrid drive and the drive output of the drivetrain is disengaged, the problem arises that after the motor vehicle comes to rest it can no longer be started again. Accordingly, a method for operating a drivetrain with a transmission and a hybrid drive is needed, by means of which, when an emergency gear in engaged in the transmission, on the one hand stalling of the combustion engine is avoided and on the other hand the motor vehicle can be restarted from rest.

SUMMARY OF INVENTION

Starting from the above, the present invention addresses the problem of providing a new type of method for operating a drivetrain comprising a transmission and a hybrid drive.

According to the invention, when an emergency gear is engaged, the motor vehicle is driving and the engine speed falls below a defined value, the clutch arranged between the combustion engine and the electric motor is disengaged.

With the method according to the invention it is proposed that when an emergency gear is engaged, the motor vehicle is driving and the engine speed falls below a defined value, a clutch arranged between the combustion engine and the electric motor of the hybrid drive is disengaged. The defined speed is preferably the idling speed of the combustion engine. This avoids stalling of the combustion engine. Moreover, once the motor vehicle has come to rest it can be restarted again in the emergency gear engaged with the help of the electric motor, while the clutch between the combustion engine and the electric motor remains disengaged.

BRIEF DESCRIPTION OF DRAWINGS

Example embodiments of the invention, to which it is not limited, are explained in more detail with reference to the drawing, which shows.

DETAILED DESCRIPTION OF THE INVENTION

The present invention concerns a method for operating a motor vehicle drivetrain comprising at least a transmission and a hybrid drive. The hybrid drive comprises a combustion engine and an electric motor.

Figure 1:
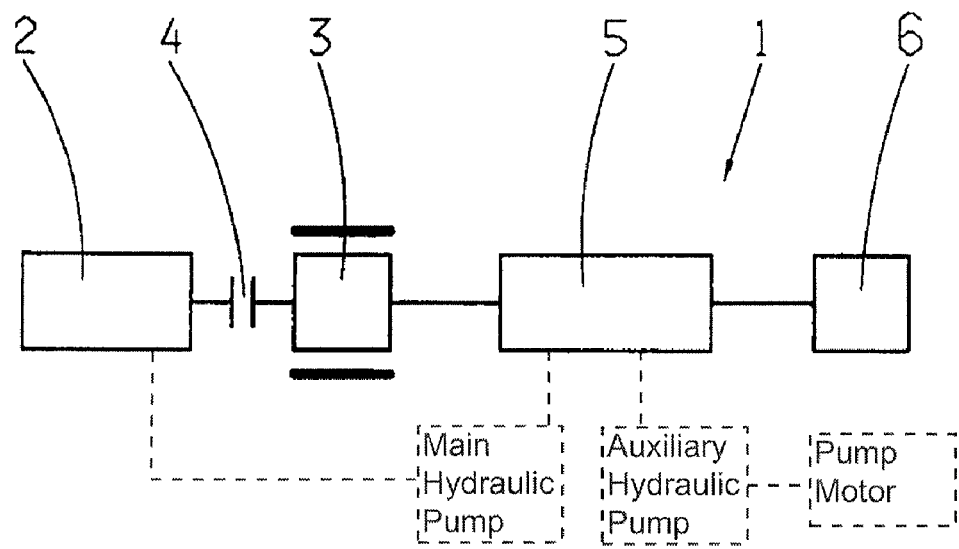
FIG. 1: is a diagram of a first motor vehicle drivetrain with which the method according to the invention can be used.
Figure 2:
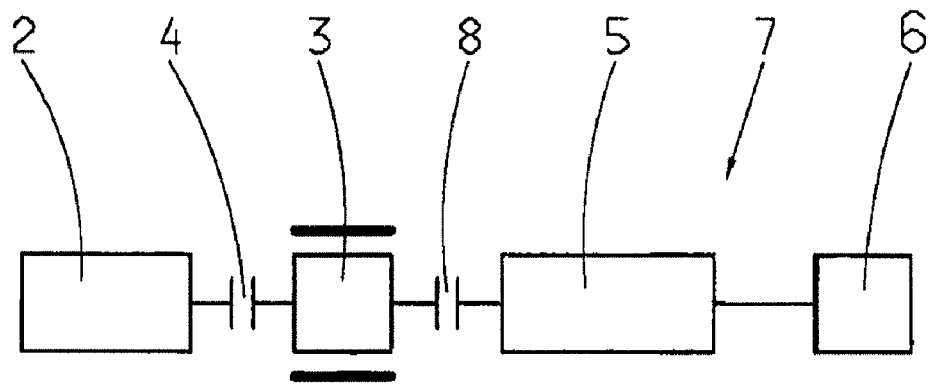
FIG. 2: is a diagram of a second motor vehicle drivetrain with which the method according to the invention can be used

FIGS. 1 and 2 show diagrams of example motor vehicle drivetrains, with which the method according to the invention can be used.

Thus, FIG. 1 shows a diagram of a motor vehicle drivetrain 1, the drivetrain of FIG. 1 comprising a hybrid drive consisting of a combustion engine 2 and an electric motor 3. Between the combustion engine 2 and the electric motor 3 is arranged a clutch 4, which is disengaged when the drivetrain 1 is being powered exclusively by the electric motor 3. Besides the hybrid drive, the drivetrain 1 in FIG. 1 also comprises a transmission 5 which delivers the traction provided by the hybrid drive to a drive output 6, namely to driven wheels of the drivetrain. The transmission can be made for example as an automatic or an automated transmission. With an automatic transmission gearshifts are carried out without traction force interruption, while with an automated transmission they take place with traction force interruption.

FIG. 2 shows another diagram of a motor vehicle drivetrain 7, the drivetrain of FIG. 2 differing from that of FIG. 1 in that a clutch 8 is arranged between the electric motor 3 of the hybrid drive and the transmission 5.

The present invention now concerns a method for operating a motor vehicle drivetrain of the type shown in FIGS. 1 and 2, with particular reference to details of the method with the help of which the drivetrain can be operated in an emergency mode in the event of a drivetrain fault, in particular a fault in a transmission control device associated with the transmission 5.

While the motor vehicle is driving, if a fault occurs in the drivetrain and in particular in the transmission control device of the transmission, a gear is or remains engaged in the transmission which corresponds to an emergency gear of the transmission 5. When this emergency gear is engaged, the motor vehicle is driving and the engine speed falls below a defined value, in particular the idling speed of the combustion engine 2, then the clutch between the combustion engine 2 and the electric motor 3 is disengaged, which reliably avoids stalling of the combustion engine 2.

After the motor vehicle has come to rest, it can be restarted with the emergency gear engaged. For this, the clutch 4 between the combustion engine 2 and the electric motor 3 remains disengaged and restarting is carried out by the electric motor. In this case the hydraulic pressure required for holding the emergency gear in the transmission 5 is provided by an auxiliary hydraulic pump driven by a pump motor (only diagrammatically shown in FIG. 1).

When a defined engine speed is exceeded, the auxiliary hydraulic pump is switched off and the hydraulic pressure required for holding the emergency gear is supplied by a main hydraulic pump driven by the drive input shaft (also only diagrammatically shown in FIG. 1).

After the vehicle has been restarted in the engaged emergency gear with the help of the electric motor 3, then when the speed rises above a defined value, preferably corresponding to the idling speed of the combustion engine 2, the clutch arranged between the combustion engine 2 and the electric motor 3 is engaged in order to start or boost the combustion engine 2.

When, for example with the motor vehicle at rest and the emergency gear engaged, the driver wants a traction force interruption and so, for example, moves the selector lever to position P or N, or when the motor vehicle is driving and a traction force interruption is called for by moving the selector lever to position N, then in accordance with an advantageous further development of the present invention a friction element between the electric motor 3 of the hybrid drive and the drive output 6 of the drivetrain can be disengaged and the clutch 4 between the combustion engine 2 and the electric motor 3 engaged, so that when the traction force is interrupted the combustion engine 2 can be started with the help of the electric motor 3 and thus, for example, a battery of the drivetrain can be charged. In the example embodiment of FIG. 1 the friction element can be a transmission-internal shift element of the transmission 5 made as a clutch or brake, and in the example embodiment of FIG. 2 it can be the transmission-external clutch 8.

INDEXES

1 Drivetrain
2 Combustion engine
3 Electric motor
4 Clutch
5 Transmission
6 Drive output
7 Drivetrain
8 Clutch

The invention claimed is:

1. A method for operating a drivetrain of a vehicle in which the drivetrain comprises a hybrid drive comprising a combustion engine (2) and an electric motor (3) with a transmission being arranged between the hybrid drive and a drive output (6), and a clutch (4) being arranged between and directly connecting the combustion engine (2) with the electric motor (3) such that, if a fault occurs in the drivetrain, a gear corresponding to an emergency gear is one of engaged or retained in engagement in the transmission (5) and the combustion engine can supply drive to the electric motor (3) without driving the drive output (6), the method comprising the steps of:

upon detecting a fault in the drivetrain, one of engaging and retaining the emergency gear; and with the emergency gear engaged, if the vehicle is driving and an engine speed falls below a defined value, then disengaging the clutch (4), arranged directly between the combustion engine (2) and the electric motor (3) so as to avoid stalling of the combustion engine (2) and assist with subsequently restarting and travel of the vehicle.

2. The method according to claim 1, further comprising the step of using an idling speed of the combustion engine (2) as the defined value; and upon stopping the vehicle, restarting and commencing further travel of the vehicle with the emergency gear engaged and with the clutch (4) still disengaged solely by utilizing drive from the electric motor (3) and supplying hydraulic pressure for retaining engagement of the emergency gear by electrically driving an auxilliary hydraulic pump via a pump motor.

3. The method according to claim 1, further comprising the step of restarting the vehicle when the emergency gear is engaged, after the vehicle has come to a stop, with the electric motor (3) while the clutch (4), arranged between the combustion engine (2) and the electric motor (3), remains disengaged.

4. The method according to claim 3, further comprising the step of providing hydraulic pressure, required for retaining engagement of the emergency gear via an auxiliary hydraulic pump driven by an electric motor, when restarting the vehicle.

5. The method according to claim 4, further comprising the step of switching off the auxiliary hydraulic pump and providing the hydraulic pressure by a main hydraulic pump driven by a drive input shaft, when the engine speed exceeds a defined value.

6. The method according to any of claim 3, further comprising the step of engaging the clutch (4), between the combustion engine (2) and the electric motor (3), to start the combustion engine (2) after restarting the vehicle in the engaged emergency gear and once the electric motor (3) speed exceeds a defined value.

7. The method according to claim 6, further comprising the step of engaging the clutch (4), between the combustion engine (2) and the electric motor (3), to start the combustion engine (2) when the electric motor (3) speed exceeds an idling speed of the combustion engine (2).

8. The method according to claim 1, further comprising the step of, with the emergency gear engaged, a driver's wish for a traction force interruption is indicated either by moving a selector lever to one of a P position or a N position, while the vehicle is at rest, or to the N position while the vehicle is driving, and disengaging a friction element, arranged between the electric motor (3) and the drive output (6), and engaging the clutch (4) between the combustion engine (2) and the electric motor (3) so that when a traction force is interrupted, the combustion engine (2) will be started and a battery charged.

9. The method according to claim 8, further comprising the step of disengaging a clutch or a brake as a transmission-internal friction element.

10. The method according to claim 8, further comprising the step of disengaging a clutch (8) as a transmission-external friction element.

11. The method according to claim 1, further comprising the step of coupling the combustion engine (2) to the electric motor (3) without coupling the electric motor (3) to the transmission (5).

12. The method according to claim 1, further comprising the step of supplying torque to the combustion engine (2) from the electric motor (3) without supplying torque to the transmission (5).

13. The method according to claim 1, further comprising the step of arranging the electric motor (3) between the combustion engine (2) and the transmission (5).

14. A method of operating a drivetrain of a vehicle, the drivetrain comprising a hybrid drive comprising a combustion engine and an electric motor (3) with a transmission (5) being arranged between the hybrid drive and a drive output (6) and a clutch (4) directly connecting the combustion engine (2) to the electric motor (3) such that the combustion engine can supply drive to the electric motor (3) without driving the drive output (6), and if a fault occurs in the drivetrain, a gear corresponding to an emergency gear is one of engaged or retained in engagement within the transmission, the method comprising the step of:

upon detecting a fault occurring within the drivetrain, one of engaging and retaining the emergency gear;

with the emergency gear engaged, if the vehicle is driving and an engine speed falls below a defined value, then disengaging the clutch (4), arranged between the combustion engine (2) and the electric motor (3), so as to avoid stalling of the combustion engine and thereafter assist with subsequently restarting and travel of the vehicle; and once the vehicle stops, restarting and commencing further travel of the vehicle with the emergency gear engaged and with the clutch (4) still disengaged solely by utilizing drive from the electric motor (3) and supplying hydraulic pressure for retaining engagement of the emergency gear by electrically driving an auxiliary hydraulic pump via a pump motor.

15. A method of operating a drivetrain of a vehicle, the drivetrain comprising a hybrid drive comprising a combustion engine and an electric motor (3) with a transmission (5) being arranged between the hybrid drive and a drive output (6) and a clutch (4) directly connecting the combustion engine (2) to the electric motor (3) such that the combustion engine can supply drive to the electric motor (3) without driving the drive output (6), and if a fault occurs in the drivetrain, a gear corresponding to an emergency gear is one of engaged or retained in engagement within the transmission, the method comprising the step of:

upon detecting a fault occurring within the drivetrain, one of engaging and retaining the emergency gear;

with the emergency gear engaged, if the vehicle is driving and an engine speed falls below a defined value, then disengaging the clutch (4), arranged between the combustion engine (2) and the electric motor (3), so as to avoid stalling of the combustion engine (2) and assist with subsequently restarting and travel of the vehicle;

once the vehicle stops, restarting the vehicle with the emergency gear engaged with the clutch (4) still disengaged solely by utilizing drive from the electric motor (3) and supplying hydraulic pressure for retaining engagement of the emergency gear by electrically driving an auxiliary hydraulic pump via a pump electric motor;

after a defined speed of the electric machine (3) is exceeded, switching off the auxiliary hydraulic pump and then using hydraulic pressure, supplied by a main hydraulic pump driven by a drive input shaft for retaining engagement of the emergency gear; and once a speed of the electric machine increases at least above an idling speed of the combustion engine (2), reengaging the clutch (4) arranged between the combustion engine (2) and the electric motor (3) in order for starting the combustion engine (2).

16. The method according to claim 15, further comprising the step of, with the emergency gear engaged, a driver's wish for a traction force interruption is indicated either by moving a selector lever to positions P or N, while the vehicle is at rest, or to position N while the vehicle is driving, and disengaging a friction element, arranged between the electric motor (3) and the drive output (6), and engaging the clutch (4) between the combustion engine (2) and the electric motor (3) so that when a traction force is interrupted, the combustion engine (2) will be started and a battery charged.

17. The method according to claim 14, further comprising the step of directly connecting the electric motor (3) to the transmission (4) via another clutch (8).

18. The method according to claim 15, further comprising the step of directly connecting the electric motor (3) to the transmission (4) via another clutch (8).

* * * * *